United States Patent Office 3,509,174
Patented Apr. 28, 1970

3,509,174
3-(INDOL-3-YL)-PHTHALIDES
Chao-Han Lin, Dayton, Ohio, assignor to The National Cash Register Company, Dayton, Ohio, a corporation of Maryland
Filed Jan. 30, 1967, Ser. No. 612,558
Int. Cl. C07d 27/56
U.S. Cl. 260—326.14    4 Claims

ABSTRACT OF THE DISCLOSURE

Novel chromogenic materials of normally colorless form, having structural formulae:

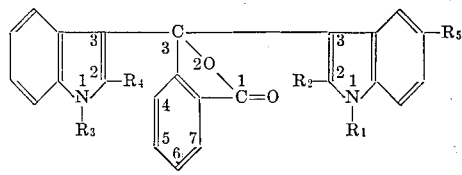

Figure 1:
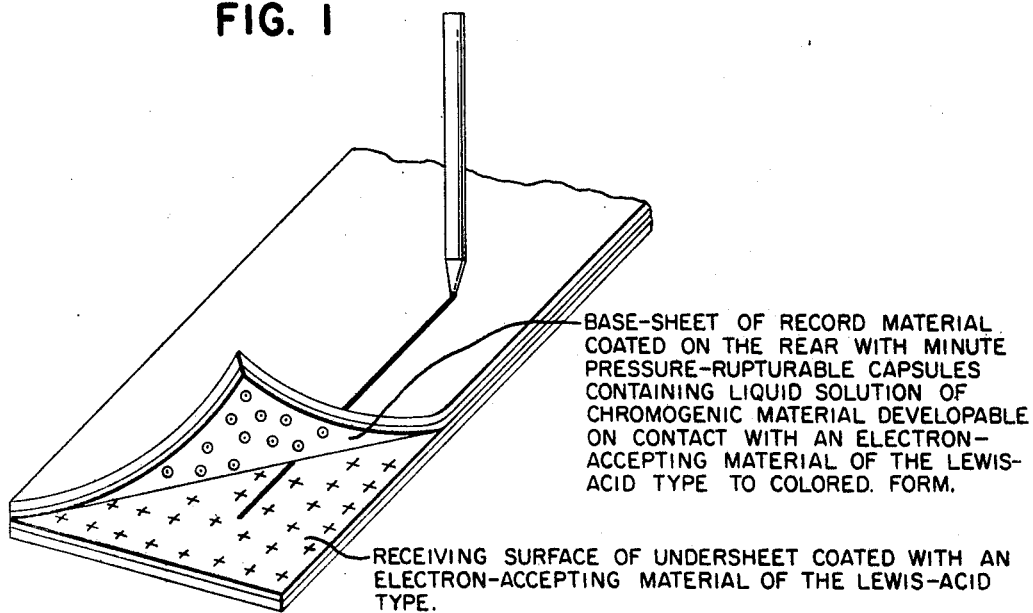

where $R_1$, $R_2$, $R_3$, and $R_4$ are selected from a group consisting of alkyl radicals having fewer than five carbon atoms, phenyl radicals, and hydrogen, and $R_5$ is selected from a group consisting of alkoxyl radicals having fewer than five carbon atoms and hydrogen, said material assuming a colored form upon contact with a Lewis acid molecule. A specific example of these novel compounds is 3 - (1,2 - dimethylindol-3-yl)-3-(2-methylindol-3-yl) phthalide.

---

This invention pertains to novel chromogenic compounds for use in pressure sensitive record material and to an improved mark-forming manifold system incorporating these novel chromogenic compounds. More specifically, this invention pertains to substituted indolyl derivatives of phthalides which have the form of substantially colorless, i.e. white or slightly colored solids, or approach being colorless when in liquid solution, but which may be converted to dark-colored forms upon reactive contact with acidic material. As used in mark-forming systems, marking in desired areas on support webs or sheets may be accomplished by effecting localized reactive contact between the chromogenic material and the acidic material on or in such a web or sheet, such material being brought thereto by transfer, or originally there in situ; the desired reactive contact forming dark-colored materials in the intended image areas.

Pressure-sensitive, mark-forming systems of the prior art include that disclosed in application for Letters Patent No. 392,404, filed Aug. 27, 1964, by Robert E. Miller and Paul S. Phillips, Jr., and now abandoned. The latter aplication provides a marking system of disposing on and/or within sheet support material 'the unreacted mark-forming components (at least one of which is a polymeric material) and a liquid solvent in which each of the mark-forming components is soluble, said liquid solvent being present in such form that it is maintained isolated by a pressure-rupturable barrier from at least one of the mark-forming components until the application of pressure causes a breach of rupture of the barrier in the area delineated by the pressure pattern. The mark-forming components thereby are brought into reactive contact, producing a distinctive mark.

It is an object of this invention to provide new and improved substances having chromogenic properties which may be incorporated in a web or coated onto the surface of a web to provide a novel manifolding unit, and which are useful in carrying out improved methods of marking involving reactive contact with a color-activating material to develop dark-colored materials in areas where marking is desired.

It is another object of this invention to provide modified compounds, based upon indolyl substituted phthalides, which are substantially colorless, or slightly colored offering a new and improved variety of chromogenic characteristics, and developing novel dark-colored substances upon contact with color-activating materials.

It is a further object of this invention to provide a new and improved mark-forming system which has the form of disposing within a web or upon the surface of a web or sheet support material unreacted chromogenic material which is capable of being reactively contacted with an acidic material to produce a dark-colored substance, thus providing marks having desirable color intensity and hue.

In accordance with this invention, there is provided a novel, substantially colorless or slightly colored, chromogenic compound having the structural formula:

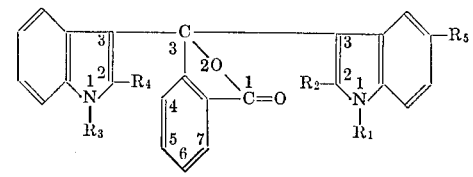

where $R_1$, $R_2$, $R_3$ and $R_4$ are selected from a group consisting of alkyl radicals having fewer than five carbon atoms, phenyl radicals, and hydrogen, and $R_5$ is selected from a group consisting of alkoxy radicals having fewer than five carbon atoms and hydrogen.

Specific examples of these novel compounds include:
3 - (1,2 - dimethylindol - 3-yl)-3-(2-methylindol-3-yl) phthalide having the structural formula:

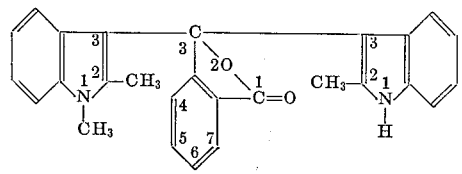

3-(1,2-dimethylindol - 3 - yl)-3-(5 - methoxy-2-methylindol-3-yl) phthalide having the structural formula:

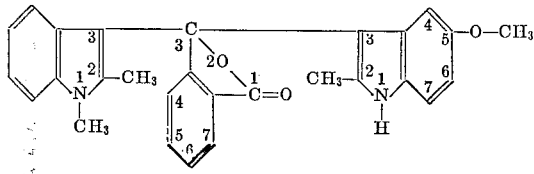

3-(1,2 - dimethylindol-3-yl) - 3 - (indol-3-yl) phthalide having the structural formula:

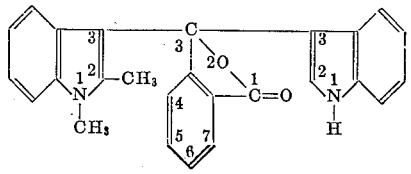

3-(1,2 - dimethylindol-3-yl) - 3 - (2-phenylindol-3-yl) phthalide having the structural formula:

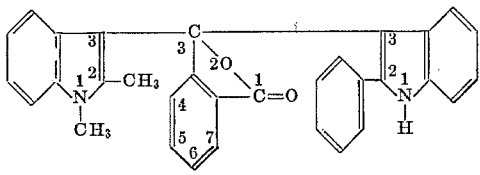

3-(1,2 - dimethylindol-3-yl) - 3 - (1-methyl-2-phenylindol-3-yl) phthalide:

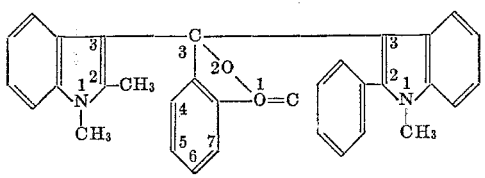

3-(1-methyl - 2 - phenylindol-3-yl) - 3 - (2-phenylindol-3-yl) phthalide:

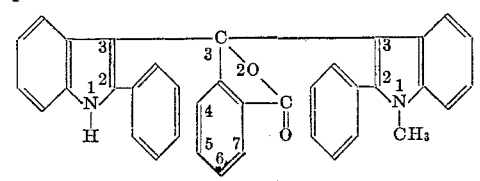

3-(1,2 - dimethylindol-3-yl) - 3 - (1-ethyl-2-methylindol-3-yl) phthalide having the structural formula:

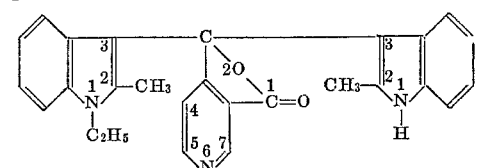

3-(2 - methylindol-3-yl) - 3 - (1-ethyl-2-methylindol-3-yl) phthalide having the structural formula:

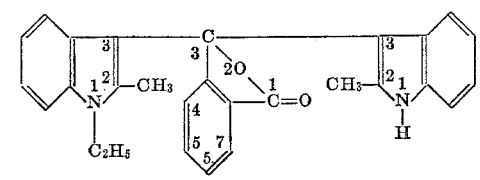

In accordance with another feature of this invention, a new composition of matter comprises the dark-colored substance having a resonant form developed by contact of a color-activating material with one of the above-mentioned chromogenic compounds. The color-developing or -activating material is an acidic substance for converting the chromogenic compound to the resonant form.

The method of marking of this invention, i.e., by developing a dark-colored material from substantially colorless or slightly colored chromogenic compounds comprises providing a chromogenic compound selected from the above-mentioned compounds and bringing such chromogenic compound into reactive contact in areas where marking is desired with an acidic color-activating substance to produce a dark-colored resonant form of the chromogenic compound by the action thereon in said areas of the said acidic substance.

The acidic materials employed in this invention can be any compound within the definition of the Lewis acid, i.e. an electron acceptor. Preferably, acidic organic polymers such as phenolic polymers are employed as the acidic material. The novel chromogenic materials exhibit the advantage of improved color stability when reacted with such phenolic polymers. The solution formation of the solid particles of polymeric material in the same solvent with the substantially colorless chromogenic compounds allows penetration of the color into the support sheet, if porous, e.g., paper, so that the colored form of the chromogenic material sinks into the body of the sheet and is not merely on the surface of the sheet. This feature protects against erasure of recorded data by attrition of the surface of the record sheet.

Reference is to be taken to the drawings. FIGURE 1 is a diagrammatic representation of a two-sheet unit manifold, a perspective in which the bottom surface of the overlying is supplied on the surface or near it with a multiplicity of minute pressure-rupturable microcapsules, each containing a droplet. Each droplet contains a solution of the basic chromogenic component. An acidic component, such as an acid clay or a phenolic polymeric material lies within the lower web or sheet or upon the upper surface of the lower web or sheet. A colored mark is made by the use of a stylus, a type character, or other pressure-writing means applied to the two-sheet unit manifold.

Figure 1A:
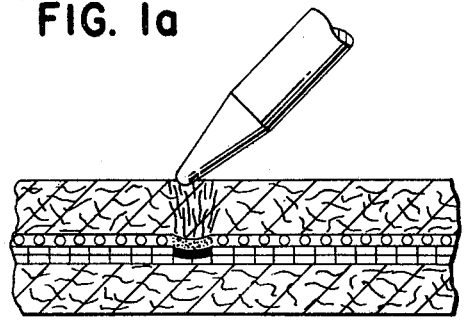

The encapsulated droplets are released on the rupture of the capsules in writing operations, as shown in FIGURE 1a. The liquid of the released droplets is transferred in the pattern of the data configuration to the top of the underlying sheet. The top of the underlying sheet is coated or impregnated with a material reactant with the chromogenic material, e.g., a phenolic polymer material having an acid-reacting OH group. The drawings show capsules on the over-sheet containing a liquid solution of chromogenic material. However, the capsules can contain the polymeric phenolic material in liquid solution and the top surface of the under-sheet may be supplied with the chromogenic material in particulate form. The improvement in the system is the chromogenic compound which is the novel substance of the instant invention.

Referring again to FIGURE 1 comprising an upper web or sheet having the chromogenic material dispersed within or upon in a contiguous juxtaposition, it is possible to incorporate the chromogenic material in a solid, crystalline-state in a binder material so that the chromogenic material may be transferred from the upper web or sheet upon the application of pressure from a stylus to deposit some of the chromogenic material on a surface carrying a color activating polymeric material. Preferably, the chromogenic substance is dissolved in a solvent and minute droplets of the solution of the chromogenic material are encapsulated in minute, pressure-rupturable capsules. Obviously, many other arrangements, configurations and relationships of the solvent and the mark-forming materials, with respect to their encapsulation and location on the supporting sheet or webs can be envisioned. Such arrangements are thoroughly described in the aforementioned application S.N. 392,404 to Miller et al., and need not be repeated herein.

It is noted that the polymeric mark-forming components should have a common solubility with the chromogenic material in at least one liquid solvent when the acid-reacting material is a phenolic or other organic acidic polymer. It is also noted that in a single system several chromogenic materials may be used with the same or different polymeric materials. Several polymeric materials can be reactively contacted with a single chromogenic compound or with a mixture of chromogenic compounds. As mentioned above, the solvent is maintained in physical isolation in minute droplets until such time as it is released by application of pressure. This may be accomplished by several known techniques, but preferably isolation is maintained by individual encapsulation of the solvent droplets in a microcapsule according to the procedures described, for example, in U.S. Patent No. 2,712,507, issued to Barret K. Green on July 5, 1955; 2,730,457, issued to Barrett K. Green and Lowell Schleicher on Jan. 10, 1956; 2,800,457, issued to Barrett K. Green and Lowell Schleicher on July 23, 1957; and 2,800,458, issued to Barrett K. Green on July 23, 1957, reissued as Reissue Patent No. 24,899 on Nov. 29, 1960. The microscopic capsules, when disposed within or upon a supporting web as a multiplicity in contiguous juxtaposition, are rupturable by pressure, such as normal marking pressures utilized, for example, in writing or typing operations.

The material or materials chosen as the wall material of the microscapsule, in addition to being pressure rupturable, must be inert or unreactive with respect to the contents of the capsule and the other mark-forming components so that the wall material remains intact under normal storage conditions until such time as it is released by the application of marking pressure. Examples of such wall materials are gelatin, gum arabic and many others thoroughly described in the aforementioned patents.

For use in record material, the capsule size should not exceed 50 microns in diameter. Preferably, the capsules should be smaller than 15 microns in diameter.

The acidic organic polymeric material useful in this invention include phenolic polymers, phenol acetylene polymers, maleic acid-rosin resins, partially or wholly hydrolyzed styrene-maleic anhydride copolymers and ethylene-maleic anhydride copolymers, carboxy polymethylene and wholly or partially hydrolyzed vinyl methyl ether maleic anhydride copolymer and mixtures thereof.

Among the phenolic polymers found useful are alkylphenol-acetylene resins, which are soluble in common organic solvents and possess permanent fusibility in the absence of being treated by cross-linking materials. A specific group of useful phenolic polymers are members of the type commonly referred to as "novolacs," (as sold by Union Carbide Corp., New York, New York) which are characterized by solubility in common organic solvents and which are, in the absence of cross-linking agents, permanently fusible. Generally, the phenolic polymer material found useful in practicing this invention is characterized by the presence of free hydroxyl groups and the absence of groups such as methylol, which tend to promote infusibility or cross-linking of the polymer, and by their solubility in organic solvents and relative insolubility in aqueous media. Again, obviously, mixtures of acidic materials can be employed.

Resoles, if they are still soluble, may be used, though subject to change in properties upon aging.

A laboratory method useful in the selection of suitable phenolic resins is the determination of the infra-red absorption pattern. It has been found that phenolic resins showing an absorption in the 3200–3500 cm.$^{-1}$ region (which is indicative of the free hydroxyl groups) and not having an absorption in the 1600–1700 cm.$^{-1}$ region are suitable. The latter absorption region is indicative of the desensitization of the hydroxyl groups and, consequently, makes such groups unavailable for reaction with the chromogenic materials.

The preparation of the phenolic formaldehyde polymeric materials for practicing this invention is described in "Industrial and Engineering Chemistry," vol. 43, pages 134 to 141, January 1951, and a particular polymer thereof is described in Example 1 of U.S. Patent No. 2,052,093, issued to Herbert Hönel on Aug. 25, 1936, and the preparation of the phenol-acetylene polymers is described in "Industrial and Engineering Chemistry," vol. 41, pages 73 to 77, January 1949.

The preparation of the maleic anhydride copolymers is described in the literature, such as, for example, one of the maleic anhydride vinyl copolymers, as disclosed in the publication, "Vinyl and Related Polymers," by Calvin E. Schildknecht, Second Printing, published April 1959, by John Wiley & Sons, Incorporated. See pages 65 to 68 (styrene-maleic anhydride copolymer), 628 to 630 (vinyl-methyl ether-maleic anhydride copolymer), and 530 to 531 (ethylene-maleic anhydride copolymer).

When the acidic material is one of the aforementioned organic polymers, the liquid solvent chosen must be capable of dissolving the mark-forming components. The solvent may be volatile or non-volatile, and a single or multiple component solvent may be used which is wholly or partially volatile. Examples of volatile solvents useful in the aforedescribed basic chromogen-acidic polymer are toluene, petroleum distillate, perchloroethylene, and xylene. Examples of non-volatile solvents are high-boiling point petroleum fractions and chlorinated biphenyls.

Generally, the solvent chosen should be capable of dissolving at least 0.3%, on a weight basis, of the chromogenic material, and about 3–5%, on a weight basis, of the polymeric material to form an efficient reaction. However, in the preferred system, the solvent should be capable of dissolving an excess of the polymeric material, so as to provide every opportunity for utilization of the chromogenic material and, thus, to assure the maximum coloration at a reaction site.

A further criterion of the solvent is that it must not interfere with the mark-forming reaction. In some instances, the presence of the solvent may interfere with the mark-forming reaction or diminish the intensity of the mark, in which case the solvent chosen should be sufficiently vaporizable to assure its removal from the reaction site after having, through solution, brought the mark-forming components into intimate admixture, so that the mark-forming contact proceeds.

Since the mark-forming reaction requires an intimate mixture of the components to be brought about through solution of said components, one or more of the mark-forming components may be dissolved in the isolated solvent droplets, the only requirement being that at least one of the components essential to the mark-forming reaction be maintained isolated until reactively contacted with the other.

In the usual case, the mark-forming components are so chosen as to produce a mark upon application of pressure at room temperature (20 to 25 degrees centigrade). However, the present invention includes a system in which the solvent component is not liquid at temperatures around room temperature but is liquid and in condition for forming solutions only at elevated temperatures.

The support member on which the components of the system are disposed may comprise a single or dual sheet assembly. In the case where all components are disposed on a single sheet, the record material is referred to as a "self-contained" system. Where there must be a migration of the solvent, with or without mark-forming component, from one sheet to another, the record material is referred to as a "transfer" system. (Such a system may also be referred to as a "two-fold" system, in that at least two sheets are required and each sheet includes a component, or components, essential to the mark-forming reaction.) Where a copious amount of the colored reaction product in liquid form is produced on a surface of one sheet, it may produce a mark by transfer to a second sheet as a colored mark.

In the preferred case, where microcapsules are employed, they may be present in the support material either disposed therethroughout or as a coating thereon, or both. The capsules may be applied to the sheet material while still dispersed in the liquid vehicle in which they were manufactured, or, if desired, separated and the separated capsules thereafter dispersed in a solution of the polymeric component (for instance, 30 grams of water and 53 grams of a 1% aqueous solution of polyvinyl methyl ether maleic anhydride) to form a coating composition in which, because of the inertness of the solution and the capsules, both retain their identity and physical integrity. When this composition is disposed as a film on the support material and dried, the capsules are held therein subject to rupture to release the liquid contained. This latter technique, relying on the inertness of the microcapsule and the dispersing medium of the film-forming mark-forming component, allows for a method of preparing a sensitive record coating with the capsules interspersed directly in a dry film of the polymeric material as it is laid down from the solution. A further alternative is to disperse in a liquid medium one or more mark-forming components, insoluble therein, and disperse in said medium the insoluble microcapsules, with the result that all components of the mark-forming system may be disposed on or within the support sheet in the one operation. Obviously, the several components may be applied individually.

The respective amounts of the several components will vary, depending primarily upon the nature of the materials and the architecture of the record material unit. Suitable lower amounts include, in the case of the chromogenic material, about 0.005 to .075 pound per ream (a ream in this application meaning five hundred (500) sheets of 25″ x 38″ paper, totaling 3,300 square feet); in the case of the solvent, about 1 to 3 pounds per ream; and in the case of the polymer, about ½ pound per ream. In all instances, the upper limit is primarily a matter of economic consideration.

In the instance where the mark-forming components are interspersed throughout a single support sheet material (so-called self-contained unit), the following technique or procedure has been found useful:, The slurry of capsules may be applied to a "wet" web of paper as it exists on the screen of a fourdrinier paper machine, so as to sink into the paper web a distance depending on the freeness of the pulp and the water content of the web at the point of application.

The capsules may be placed directly in the paper or in a support sheet, it means not only capsule structures, but films which hold a multitude of droplets for local release in an area subject to pressure.

With respect to the acidic organic polymeric component, a solution thereof in an evaporable solvent is introduced into twice as much water and agitated while the evaporable solvent is blown off by an air blast. This leaves an aqueous colloidal dispersion slurry of the polymeric material, which may be applied to the paper so as to leave a surface residue, or the slurry may be applied to paper at the size-press station of a paper-making machine by roller. In another method of making a polymer-sensitized sheet, the water-insoluble polymer is ground to the desired particle size in a ball mill with water, preferably with a dispersing agent, such as a small quantity of sodium silicate. If a binder material of hydrophilic properties is ground with the phenolic material, the binder itself may act as a dispersant. If desired, an amount of binder material of up to 40%, by weight, of the employed amount of the polymeric material may be added to the ball-milled slurry of materials, such binder materials being of the paper coating binder class, including gum arabic, casein, hydroxyethyl cellulose, and latex (such as styrene-butadiene copolymer). If desired, oil adsorbents in the form of fuller's earths may be added to the polymeric material particles to assist in retaining, in situ, the liquid droplets to be transferred to it in data-representing configuration, for the purpose of preventing "bleeding" of the print.

Another way of applying the chromogenic or polymeric material individually to a single sheet of paper is by immersing a sheet of paper in a 1% to 10% solution of the material in an evaporable solvent. Obviously, this must be done alone for each reactant, because if the other reactant material were present, it would result in a premature coloration over the sheet area. A dried sheet with one component then may be coated with a solution of the other component, the solvent of which is a non-solvent to the already supplied component.

The polymeric material may be dissolved in ink composition vehicles to form a printing "ink" of colorless character and, thus, may be used to spot-print a proposed record sheet unit sensitized for recording in a reaction-produced color in those areas by application of a solution of the chromogenic material.

In the case of phenolic polymer, a printing ink may be made of up to 75% weight, of the phenolic polymeric material in a petroleum solvent to a viscosity suitable for printing purposes. The relative amounts of components to be used are the most convenient and economical amounts consistent with proper visbility of the recorded data. The resolution of the recorded data is, among other things, dependent on particle size, distribution and amount of particles, liquid solvent migration, chemical reaction efficiency, and other factors, all of which are things that may be worked out empirically by one familar with the art, and which do not determine the principle of the invention, which, in part, involves means for enabling the bringing into solution, by marking pressure, of two normally solid components in a common liquid solvent component held isolated as liquid droplets, preferably in marking-pressure-rupturable capsules having film walls, or else held isolated in a continuous marking-pressure-rupturable film as a discontinuous phase.

In the base-acid color system of this invention the acidic marked-forming component(s) reacts with the basic chromogenic material(s) to effect distinctive color formation or color change. In a multi-sheet system in which an acidic organic polymer is employed, it is desirable to include other materials to supplement the reactants. For example, kaolin can be added to improve the transfer of the liquid and/or the dissolved materials between the sheets. In addition, other materials such as bentonite, attapulgite, talc, feldspar, halloysite, magnesium trisilicate, silica gel, pyrophyllite, zinc sulfate, zinc sulfide, calcium sulfate, calcium citrate, calcium phosphate, calcium fluoride, barium sulfate and tannic acid can be included.

Various methods known to the prior art and disclosed in the aforementioned application S.N. 392,404 to Miller et al. and U.S. patent application S.N. 420,193 to Phillips et al., now U.S. Patent No. 3,455,721 can be employed in coating compositions of the mark-forming materials into their supporting sheets. An example of the compositions which can be coated onto the surface of an underlying sheet of a two-sheet system to react with the capsule coating on the underside of an overlying sheet is as follows.

| Coating composition | Percent by wt. |
|---|---|
| Phenolic polymer mixture | 17 |
| Paper coating kaolin (white) | 57 |
| Calcium carbonate | 12 |
| Styrene butadiene latex | 4 |
| Ethylated starch | 8 |
| Gum arabic | 2 |
| | 100 |

EXAMPLE I

Preparation of 3-(1,2-dimethylindol-3-yl-3-(2-methylindol-3-yl) phthalide

An intermediate keto-acid, 1,2--dimethyl-3-(2-carboxybenzoyl) indole was prepared as follows: 15.0 grams of dimethylindole, 7.5 grams of phthalic anhydride, 40 milliliters of benzene and 16 grams of aluminum chloride were stirred in a beaker under an ice-bath for 20 minutes and thereafter stirred at room temperature for 4 hours. The reaction mixture was washed three times with absolute ether, treated with 300 milliliters of a 3 normal hydrochloric acid solution, and filtered to separate a red insoluble material exhibiting a weight of 11.8 grams. The red insoluble material was treated with a 10% solution of sodium carbonate and filtered. The pH of the resulting filtrate was adjusted to 2.5 whereupon the reprecipitation of the desired material occurred. The latter precipitate was recrystallized twice from denatured alcohol to yield an intermediate product exhibiting a melting point of 238–239° C.

Preparation of the title compound was performed as follows: 0.58 gram of 1,2-dimethyl-3-(2-carboxybenzoyl) indole, 0.26 gram of 2-methylindole and 7 milliliters of acetic anhydride were heated together for 15 minutes, poured into 75 milliliters of water, made alkaline with ammonium hydroxide and digested on a hot plate at a temperature below boiling temperature for 15 minutes.

The precipitate was removed by filtration, dissolved in benzene and treated with activated charcoal to yield a yellow solution. Upon concentrating to a volume of 10 milliliters and the addition of petroleum ether, a crude product weighting 0.78 gram was obtained. The product was chromatographed on an alumina column. The fraction obtained by eluting with ethyl acetate, gave a solid melting at 280–282° C. A benzene solution of the product turned red when contacted with attapulgite clay and with phenolic resin coated on paper.

EXAMPLE II

Preparation of 3-(1,-dimethylindol-3-yl)-3-(2-methyl-5-methoxyindol-3-yl) phthalide The keto-acid intermediate, 1,2-dimethyl-3-(2-carboxybenzoyl) indole prepared as set forth in Example I was used as a starting product in the instant example. 0.57 gram of the keto-acid, 0.40 gram of 2-methyl-5-methoxyindole, and 20 milliliters of acetic anhydride were boiled in a 50 milliliter beaker over a hot plate for 10 minutes. The reaction mixture was poured into 150 milliliters of water, made alkaline with ammonium hydroxide, and mechanically stirred for 30 minutes. A solid precipitate formed which was separated and purified by dissolving in benzene and treating with petroleum ether. The product melted at 186–188° C. A benzene solution of the 3-(1,2-dimethylindol-3-yl)-3-(5-methoxy-2-methylindol-3-yl) phthalide product turned red when contacted with attapulgite clay coated on paper and with phenol polymer coated on paper.

EXAMPLE III

Preparation of 3-(1,2-dimethylindol-3-yl)-3-(indol-3-yl) phthalide

A few milligrams of the keto-acid, 1,2-dimethyl-3-(2-carboxybenzoyl) indole, prepared in the procedure set forth in Example I, a few milligrams of indole, 3 milliliters of acetic anhydride were heated for 5 minutes. The procedure of Example I was followed to obtain the title product. A benzene solution of said product turned pink when contacted with attapulgite clay coated on paper and with phenolic polymer coated on paper.

EXAMPLE IV

Preparation of 3-(1,2-dimethylindol-3-yl)-3-(2-phenylindol-3-yl) phthalide was performed as set forth in Example III using as reactants a few milligrams of 1,2-dimethyl-3-(2-carboxybenzoyl) indole, 2-phenylindole, and 3 milliliters of acetic anhydride. A benzene solution of the product turned pink when contacted with attapulgite clay coated on paper and a bluish-pink when contacted with a phenolic polymer coated on paper.

EXAMPLE V

The preparation of 3-(1,2-dimethylindol-3-yl)-3-(1-methyl-2-phenylindol-3-yl) phthalide 0.59 gram of 1,2-dimethyl-3-(2-carboxybenzoyl) indole, 0.41 gram of 1-methyl-2-phenylindole and 5 milliliters of acetic anhydride were heated to almost boiling for 20 minutes. The reaction mixture was poured into 100 milliliters of water, made alkaline with ammonium hydroxide and stirred for 1–2 hours. The precipitate which was separated and air dried exhibited a weight of 0.98 gram. The crude product was purified by recrystallization from benzene and exhibited a melting point of 237–238° C.

The benzene solution of the said phthalide turned a purple color when contacted with attapulgite clay coated on paper and with a phenolic resin coated on paper.

EXAMPLE VI

The preparation of 3-(1-methyl-2-phenylindol-(2-phenylindol-3-yl) phthalide

2–3 mililgrams of 1-methyl-2-phenyl-2-(2-carboxybenzoyl) indole, 2–3 milligrams of 2-phenylindole and 2 milliliters of acetic anhydride were heated to boiling for 5–10 minutes. The reaction mixture was poured into 5 milliliters of benzene and 5 milliliters of water and treated with ammonium hydroxide until the aqueous layer was basic. The layers were separated and the benzene solution concentrated to about 1–2 milliliters. When applied to attapulgite clay coated on paper the said solution appeared grayish-purple; when contacted with a phenolic resin coated on paper, the solution turned purple.

EXAMPLE VII

The preparation of 3-(1,2-dimethylindol-3-yl)-3-(1-ethyl-2-methylindol-3-yl) phthalide 0.46 gram of 1-ethyl-2-methyl-3-(2-carboxylbenzoyl) indole, 0.22 gram of 1,2-dimethylindole and 7 milliliters of acetic anhydride were heated together for 15 minutes, poured into 75 milliliters of water, made alkaline with ammonium hydroxide and stirred for 90 minutes. A precipitate which formed was removed by filtration and air-dried, exhibiting a weight of 0.68 gram. The precipitate was purified by dissolving in benzene and precipitating the benzene solution with a small amount of petroleum ether. A benzene solution of the product, melting at 238–240° C., turned red when contacted with attapulgite clay coated on paper and with a phenolic resin coated on paper.

EXAMPLE VIII

The preparation of 3-(2-methylindol-3yl)-3-(1-ethyl-2-methylindol-3-yl) phthalide 0.92 gram of 1-ethyl-2-methyl-3-(2-carboxybenzoyl) indole, 0.4 gram of 2-methylindole and 10 millilters of acetic anhydride were stirrel in a flask immersed in an oil bath maintained at 35–45° C. for 120 minutes. The reaction mixture was poured into 100 milliliters of water, and neutralized with ammonium hydroxide. The precipitate was removed by filtration, air-dried, and dissolved in benzene. Upon the addition of a small amount of petroleum ether and standing, a light pink solid separated. The solid exhibited a melting point range of 233–235° C. A benzene solution of the product turned red when contacted with attapulgite clay coated on paper and with phenolic resin coated on paper.

What is claimed is:

1. 3-(1,2-dimethylindol-3-yl)-3-(2-methyl-5 - methoxyindol-3-yl) phthalide having the structural formula:

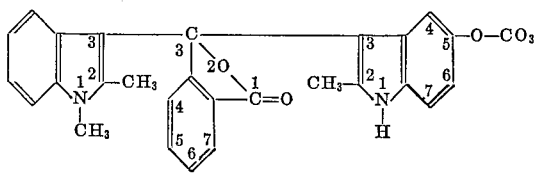

2. 3-(1,2-dimethylindol-3-yl)-3-(2-phenylindol - 3 - yl) phthalide having the structural formula:

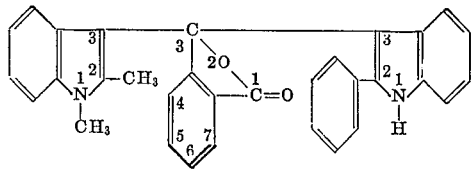

3. 3-(1,2-dimethylindol-3-yl)-3-(1 - methyl - 2 - phenylindol-3-yl) phthalide having the structural formula:

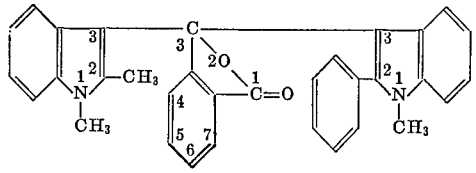

4. 3-(1-methyl-2-phenylindol-3-yl)-3 - (2 - phenylindol-3-yl) phthalide having the structural formula:
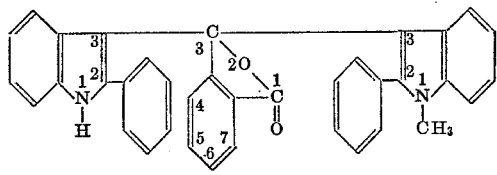
References Cited
Oddo, Chem. Abs., vol. 19, p. 2823 (1925).
ALEX MAZEL, Primary Examiner
J. A. NARCAVAGE, Assistant Examiner
U.S. Cl. X.R.
117—36.2, 36.9, 155; 282—28

UNITED STATES PATENT OFFICE
CERTIFICATE OF CORRECTION

Patent No. 3,509,174      Dated April 28, 1970

Inventor(s) CHAO-HAN LIN

It is certified that error appears in the above-identified patent and that said Letters Patent are hereby corrected as shown below:

Column 1, line 25, "alkoxyl" should be --alkoxy--; line 54, "aplication" should be --application--. Column 3, line 15, " 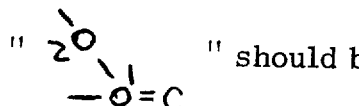 " should be -- 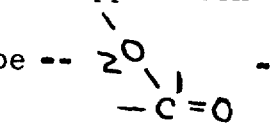 --; about line 35, " 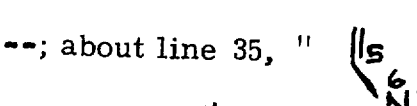 " should be -- 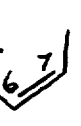 --; about line 35, " 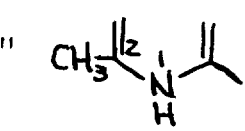 " should be -- 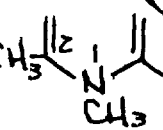 --; lines 58-59, "from the" should be --from among the--. Column 5, line 4, "microscapsule" should be --microcapsule--. Column 8, line 1, "visbility" should be --visibility--; line 16, "marked-forming" should be --mark-forming--; line 49, "-3-yl-3-" should be -- -3-yl)-3- --; line 51, "1, 2--dimethyl" should be -- 1, 2-dimethyl--. Column 9, line 5, "weighting" should be --weighing--; line 13, "3-(1, -dimethylindol" should be

CONTINUED . . .

UNITED STATES PATENT OFFICE
CERTIFICATE OF CORRECTION

Patent No. 3,509,174   Dated April 28, 1970

Inventor(s) CHAO-HAN LIN

It is certified that error appears in the above-identified patent and that said Letters Patent are hereby corrected as shown below:

CONCLUDED...

-- 3-(1,2-dimethylindol--; line 72, "3-(1-methyl-2-phenylindol-" should be -- 3-(1-methyl-2-phenylindol-3-yl)- --; line 73, "(2-phenyl-indol-3-yl)" should be -- 3-(2-phenylindol-3-yl) --; line 75, "phenyl-2-(2-carboxyben-" should be -- phenyl-3-(2-carboxyben- --. Column 10, line 15, "(2-carboxylbenzoyl)" should be -- (2-carboxybenzoyl)--; line 30, "-3yl)-3-" should be -- -3-yl)-3- --; line 34, "millilters" should be --milliliters--; line 35, "stirrel" should be --stirred--; line 44, "with phenolic" should be --with a phenolic--. Claim 1, " 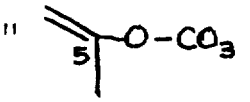 " should be -- 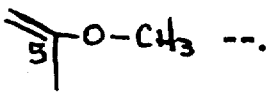 --.

SIGNED AND SEALED
SEP 15 1970

(SEAL)
Attest:

Edward M. Fletcher, Jr.
Attesting Officer

WILLIAM E. SCHUYLER, JR.
Commissioner of Patents